Patented Dec. 1, 1953

2,661,280

UNITED STATES PATENT OFFICE 2,661,280

PROCESS FOR REMOVING TELLURIUM FROM ANTIMONY

Yurii E. Lebedeff, Metuchen, and William C. Klein, Menlo Park, N. J., assignors to American Smelting and Refining Company, New York, N. Y., a corporation of New Jersey No Drawing. Application September 15, 1951, Serial No. 246,874

6 Claims. (Cl. 75—69)

1

This invention relates to the removal of tellurium from antimony.

An important object of the invention is to provide a simple, efficient and economical process for removing tellurium from antimony containing tellurium as an impurity without removing appreciable quantities of antimony with the tellurium and further to provide a process for preparing antimony having a low tellurium content.

Although the novel features which are believed to be characteristic of this invention will be particularly pointed out in the claims appended hereto, the invention itself as to its objects and advantages and the manner in which it may be carried out may be better understood by reference to the following description.

It has been found that tellurium contained in antimony can be removed therefrom by melting the antimony in a refractory vessel, incorporating an alkali metal reagent in the melt, forming a slag of the alkali metal reagent containing tellurium, and separating the slag from the body of the antimony. The alkali metal reagent can be most effectively and economically incorporated into the melt by treating the liquid metal with a molten reducible alkali metal compound in the presence of a reducing agent. The alkali metal compound reacts rapidly in the presence of the reducing agent with the tellurium in the antimony to form a slag containing tellurium. The slag may be readily removed from the antimony by skimming from the surface, thereby purifying the antimony with respect to the tellurium.

It has also been found that the tellurium in the slag is continuously volatilized therefrom as the process proceeds and that the more prolonged the treatment, the greater the amount of tellurium removed from the slag. The volatilized tellurium is probably in the form of tellurium hydride. This feature is advantageous particularly when treating antimony containing a relatively high concentration of tellurium. In such cases, a relatively low ratio of slag to melt may be used without obtaining an undesirably high concentration of tellurium in the slag.

As stated earlier, the reaction between the reduced alkali metal and the tellurium in the antimony is sufficiently rapid so that the tellurium is removed from the antimony into the slag in a relatively short time. For this reason, the slag separated from the molten liquid preferably contains a major portion of the tellurium removed from the antimony, although a slag may also be removed which contains a minor portion of the

2 tellurium separated from the molten antimonial liquid.

Any of the common reducing agents such as coal, coke or charcoal may be used in the process but it has been found that the use of a reducing gas such as natural gas is particularly advantageous because the gas may be used to agitate the molten antimony by bubbling it through the molten metal and at the same time provide the reducing agent for the reaction between the tellurium and the reducible compound. Water gas, producer gas, hydrogen or any hydrocarbon gas that is readily available may be used. In case a solid reducing agent is used it is added to the surface of the molten metal and mechanical agitation of the metal, reducing agent, and alkali metal compound is provided.

Sodium hydroxide or sodium carbonate are preferable as the reducible alkali metal reagent because they are usually readily available at reasonable cost and have melting points that are low enough for use in the process but the hydroxides or carbonates of the other alkali metals may be used. Sodium chloride or any other suitable salt may be added to the alkali metal compound to adjust the melting point since it is preferable to treat the molten antimony with the alkali metal in fluid form to secure better contact between metal and reagent. If the basic alkali reagent used is liquid at the temperature of the molten metal being treated, the addition of a salt for adjusting the melting point of the reducible compound may be dispensed with.

The following are specific examples of the mode of operating the process.

Example I

Fourteen hundred pounds of antimony metal containing .50% tellurium was heated to approximately 1300° F. in a refractory container and 33 lbs. of sodium carbonate containing 17 lbs. of sodium chloride was added to the surface of the molten metal where it quickly melted. The mixture was agitated by passing city gas through the body of the molten metal for a period of approximately thirty minutes at which time a slag of approximately 23 lbs. containing 2½% tellurium and 24.8% antimony had formed. The body of the metal analyzed only .18% tellurium after this treatment. A further treatment in the same way with the same amount of reagent reduced the tellurium content to .11%.

Example II

Fourteen hundred pounds of antimony metal containing .68% tellurium was melted in a suitable container to 1300° F. and 25 lbs. of sodium hydroxide containing 10 lbs. of sodium chloride was added to the surface of the molten metal. The alkali metal hydroxide rapidly became fluid whereupon natural gas was passed into the molten metal through a tube placed beneath the surface of the metal for approximately thirty minutes while the temperature of the molten metal was held in the range of 1300 to 1350° F. Approximately 20 lbs. of slag which analyzed 6.7% Te and 12.9% Sb was then skimmed from the surface of the metal. The remaining antimony contained only .4% Te. Two additional like treatments with similar amounts of reagent reduced the tellurium content of the antimony to only .03%.

*Example III*

Fifteen hundred pounds of antimony metal containing .61% tellurium was melted in a suitable container to 1300° F. and 36 lbs. of molten potassium hydroxide was added to the molten metal. Natural gas was passed into the molten metal through a Carborundum tube placed beneath the surface of the metal for approximately thirty minutes while the temperature of the molten metal was held in the range of 1300 to 1350° F. Approximately 14 lbs. of slag was then skimmed off. The slag analyzed 5.8% tellurium. The remaining antimony contained only .46% Te. Two additional like treatments with similar amounts of reagent reduced the tellurium content of the antimony to .15%.

*Example IV*

Fifteen hundred grams of antimony metal containing .61% tellurium was melted in a graphite crucible to 1300° F. under an atmosphere of nitrogen. Seventy-five grams of molten sodium hydroxide was added to the surface of the molten metal as a cover for the bath and as a carrier for metallic sodium. Fifty grams of metallic sodium then was added to the molten caustic. The melt under the atmosphere of nitrogen was agitated by passing nitrogen through a tube placed beneath the surface of the antimony metal; the agitation continuing for thirty minutes while the temperature of the molten metal was held in the range of 1300 to 1350° F. Approximately 125 grams of slag was then skimmed off. The slag analyzed 5% Te and the remaining antimony contained .08% Te.

*Example V*

Fourteen hundred and eighty-eight pounds of antimony metal containing 0.64% tellurium was heated to approximately 1300° F. in a refractory container under a blanket of natural gas after which 75 lbs. of melted sodium hydroxide was added to the surface of the metal pool. The mixture was agitated by passing natural gas into the molten metal through a tube placed beneath the surface thereof for a period of ten minutes while the temperature of the metal was held in the range of 1300 to 1350° F. At the end of the ten minute period a slag containing 3.17% tellurium was skimmed from the surface of the metal. The antimony remaining after the removal of the slag was found to contain 0.2% tellurium.

The above procedure was repeated starting with 1471 lbs. of antimony metal containing 0.62% Te and using 75 lbs. of melted sodium hydroxide. The agitation with natural gas was continued for two hours, however. The slag removed at the end of the two hour period was found to contain 0.9% tellurium and the remaining antimony metal contained 0.2% Te.

It will be noted that sufficient tellurium was volatilized from the slag during the longer period of the second run to reduce the tellurium concentration in this slag to 0.9%.

The small amount of antimony lost in the slag constitutes a particular advantage of the process. By careful control of the process it has been found that the loss of antimony may be maintained as low as 3 lbs. of antimony per pound of tellurium removed from the metal.

While the process for removal of tellurium from antimony has been particularly described with reference to specific reducible alkali metal compounds and certain reducing agents, the process is not limited to the specific reducing agents or reducible alkali metal compounds, temperatures or operating procedures described but may be practiced in other ways within the scope of the claims hereinafter made.

What is claimed is:

1. A process for removing tellurium from antimony which comprises establishing a pool of molten antimony metal containing tellurium and having thereon an overlying layer of molten slag, agitating said molten antimony metal pool in the presence therein of an alkali metal, discontinuing said agitation, and separating from the body of the antimony a slag containing tellurium.

2. A process according to claim 1 in which the alkali metal is formed in situ in said pool.

3. A process for removing tellurium from antimony which comprises establishing a pool of molten antimony metal containing tellurium and having thereon an overlying layer of molten material comprising a reducible alkali metal compound, introducing a reducing gas beneath the surface of said molten pool thereby agitating said pool and said overlying layer, thereby also reducing said alkali metal compound and incorporating the reduced alkali metal into said pool, continuing the introduction of said reducing gas until the tellurium content of said antimony is reduced by a desired amount, thereafter discontinuing the introduction of said gas, and separating from the body of the antimony a slag containing tellurium.

4. A process according to claim 3 in which the reducing gas is natural gas.

5. A process according to claim 3 in which said overlying layer comprises a member of the group consisting of alkali metal hydroxides and alkali metal carbonates.

6. A process according to claim 3 in which the separated slag contains a major portion of the tellurium removed from the antimony.

YURII E. LEBEDEFF.
WILLIAM C. KLEIN.

References Cited in the file of this patent

UNITED STATES PATENTS

| Number | Name | Date |
|---|---|---|
| 1,548,854 | Schleicher | Aug. 11, 1925 |
| 1,654,527 | Burkey | Jan. 3, 1928 |
| 1,654,528 | Burkey | Jan. 3, 1928 |
| 1,662,439 | Rose | Mar. 13, 1928 |

OTHER REFERENCES

"Antimony" by Chung Yu Wong, p. 135, published 1909.